(12) United States Patent
Mori et al.

(10) Patent No.: US 11,784,595 B2
(45) Date of Patent: Oct. 10, 2023

(54) CONTROLLER FOR AC ROTARY ELECTRIC MACHINE AND ELECTRIC POWER STEERING APPARATUS

(71) Applicant: Mitsubishi Electric Corporation, Tokyo (JP)

(72) Inventors: Tatsuya Mori, Tokyo (JP); Masahiko Orii, Tokyo (JP); Genki Fujii, Tokyo (JP); Yu Hirotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 17/613,159

(22) PCT Filed: Jul. 30, 2019

(86) PCT No.: PCT/JP2019/029746
§ 371 (c)(1),
(2) Date: Nov. 22, 2021

(87) PCT Pub. No.: WO2021/019662
PCT Pub. Date: Feb. 4, 2021

(65) Prior Publication Data
US 2022/0224266 A1   Jul. 14, 2022

(51) Int. Cl.
*H02K 29/06* (2006.01)
*H02P 6/10* (2006.01)
(Continued)

(52) U.S. Cl.
CPC ............ *H02P 21/05* (2013.01); *B62D 5/0463* (2013.01); *H02P 21/22* (2016.02)

(58) Field of Classification Search
CPC ........ H02P 21/05; H02P 21/22; B62D 5/0463
(Continued)

(56) References Cited

U.S. PATENT DOCUMENTS 6,008,617 A * 12/1999 Kaneko .................. H02P 21/06
318/632
2011/0266992 A1* 11/2011 Nishiguchi ............. H02P 27/08
318/807
(Continued)

FOREIGN PATENT DOCUMENTS

EP           2958228 A1    12/2015
JP       2007-274779 A    10/2007
(Continued)

OTHER PUBLICATIONS

Extended European Search Report dated Jul. 25, 2022 in Application No. 19939074.1.
(Continued)

*Primary Examiner* — Erick D Glass
(74) *Attorney, Agent, or Firm* — Sughrue Mion, PLLC; Richard C. Turner

(57) ABSTRACT

To provide a controller for AC rotary electric machine and an electric power steering apparatus which can superimposes a cancellation current for canceling the torque ripple component on the winding current in feedforward manner and cancel the torque ripple component. A controller for AC rotary electric machine calculates an oscillation voltage command value of q-axis which has the same frequency as the torque ripple component; calculates a reverse phase of the torque ripple component based on the current information and the magnetic pole position; calculates a correction phase corresponding to the phase delay of the actual current with respect to the oscillation voltage command value of q-axis; and sets a phase of the oscillation voltage command value of q-axis to a phase obtained by advancing the reverse phase of the torque ripple component by the correction phase.

13 Claims, 7 Drawing Sheets

(51) Int. Cl.
    *H02P 21/05*     (2006.01)
    *H02P 21/22*     (2016.01)
    *B62D 5/04*     (2006.01)

(58) Field of Classification Search
    USPC .................................................. 318/400.23
    See application file for complete search history.

(56) References Cited

U.S. PATENT DOCUMENTS

| 2015/0214867 | A1* | 7/2015 | Takahashi | ............... | H02P 21/50 |
| | | | | | 318/400.02 |
| 2016/0072416 | A1 | 3/2016 | Hirotani et al. | | |
| 2017/0005600 | A1 | 1/2017 | Takesaki et al. | | |
| 2019/0052210 | A1 | 2/2019 | Li et al. | | |

FOREIGN PATENT DOCUMENTS

| JP | 2011-088491 A | 5/2011 |
| JP | 2016-111788 A | 6/2016 |
| JP | 2017-017899 A | 1/2017 |
| JP | 2018-183016 A | 11/2018 |

OTHER PUBLICATIONS

Office Action dated Mar. 8, 2022 in Japanese Application No. 2021-536499.
International Search Report of PCT/JP2019/029746 dated Oct. 8, 2019 [PCT/ISA/210].
Chinese Office Action dated Jul. 4, 2023 in Patent Application No. 201980098117.9.

* cited by examiner

CONTROLLER FOR AC ROTARY ELECTRIC MACHINE AND ELECTRIC POWER STEERING APPARATUS

CROSS REFERENCE TO RELATED APPLICATIONS

This application is a National Stage of International Application No. PCT/JP2019/029746 filed on Jul. 30, 2019.

TECHNICAL FIELD

The present disclosure is related with a controller for AC rotary electric machine and an electric power steering apparatus.

BACKGROUND ART

When controlling the AC rotary electric machine, it is desired to reduce the torque ripple component superimposed on the output torque. In the technology of PLT 1, as described in the paragraph 0033, FIG. 2, and the paragraph 0041 of PLT 1, even if the AC voltage of fundamental wave is applied to the winding, since the winding current is distorted from the fundamental wave due to spatial harmonic resulting from magnetic saturation, and the torque ripple component is caused by distortion of current, the correction voltages vdh, vqh of the harmonic wave for making the fundamental wave current flow into winding is superimposed on the voltage commands.

In the technology of PLT 2, as shown in the FIG. 2 of PLT 2, the q-axis correction value WFBq which corrects the q-axis voltage command value GFBq is calculated based on the P control value PFBq of the current feedback control. In the paragraph 0056 of PLT 2, it is described that the q-axis correction value WFBq becomes a reverse phase of the q-axis current detection value. In FIG. 9 (a), (b) of PLT 2, it can be confirmed becoming the reverse phase. And, in the paragraph 0058 of PLT 2, it is described that the q-axis correction value WFBq is the feedback control for ripple suppression which is performed separately from the normal feedback control in order to suppress the ripple of q-axis current.

CITATION LIST

Patent Literature

PLT 1: JP 2016-111788 A
PLT 2: JP 2017-17899 A

SUMMARY OF INVENTION

Technical Problem

In the technology of PLT 1 and PLT 2, it is configured that distortion or oscillation of current is suppressed by superimposing the correction voltage on the voltage command value. However, in the AC rotary electric machine, the torque ripple component is not necessarily suppressed by suppressing distortion or oscillation of current. In the AC rotary electric machine, a torque constant (ratio of torque and current) may be fluctuated according to the magnetic pole position, due to the spatial harmonic resulting from the magnetic saturation and the like. Especially, in the cheap AC rotary electric machine whose countermeasure to fluctuation of the torque constant is not sufficient, this trend becomes large. Due to this fluctuation of the torque constant, a torque ripple component is superimposed on output torque. The torque ripple component due to fluctuation of the torque constant does not appear in the current detection value. Therefore, in order to cancel the torque ripple component, it is necessary to superimpose a current oscillation component for canceling the torque ripple component on the winding current in feedforward manner.

However, since the torque ripple component is a harmonic wave component (for example, 6th order) of the rotational frequency of the magnetic pole position, the frequency of the torque ripple component increases as the rotational angle speed of the rotor (the magnetic pole position) increases. Accordingly, even if a cancellation current oscillation component is superimposed on the current command value, when the rotational angle speed becomes high, the frequency of the current oscillation component becomes higher than the cutoff frequency of current feedback control, and the actual winding current cannot follow the current oscillation component of the current command value. Therefore, by the method for superimposing the cancellation current oscillation component on the current command value, in the high speed region, the cancellation current oscillation component cannot be superimposed on the winding current, and the torque lip component cannot be canceled.

Since the AC rotary electric machine is a kind of inductive load, when the AC rotary electric machine is rotating, there is a phase deviation between the q-axis current and the q-axis voltage. Therefore, like PLT 2, if the phase of q-axis correction voltage is set to the reverse phase of the torque ripple component which becomes the same phase as the phase of the q-axis current, the torque ripple component cannot be canceled with good accuracy.

Thus, it is desirable to provide a controller for AC rotary electric machine and an electric power steering apparatus which can superimposes a cancellation current for canceling the torque ripple component on the winding current in feedforward manner and cancel the torque ripple component.

Solution to Problem

A controller for AC rotary electric machine according to the present disclosure, including:
a magnetic pole position detection unit that detects a magnetic pole position of the rotor;
a basic voltage command value calculation unit that, on dq-axis rotating coordinate system consisting of a d-axis defined in a direction of the detected magnetic pole position and a q-axis defined in a direction advanced to the d-axis by 90 degrees in an electrical angle, calculates a basic voltage command value of the d-axis, and a basic voltage command value of the q-axis;
an oscillation voltage command value calculation unit that calculates an oscillation voltage command value of the q-axis which has the same frequency as a torque ripple component superimposed on an output torque of the rotor, and which is for canceling the torque ripple component; and
a switching control unit that controls on/off a plurality of switching devices provided in the inverter, based on the basic voltage command value of d-axis, and a voltage command value of the q-axis obtained by superimposing the oscillation voltage command value of q-axis on the basic voltage command value of q-axis;
wherein the oscillation voltage command value calculation unit calculates a reverse phase of the torque ripple component, based on a current information which flows through the winding, and the magnetic pole position;

calculates a correction phase, in a period of the oscillation voltage command value of q-axis, which corresponds to a phase delay of an actual current with respect to the oscillation voltage command value of q-axis; and sets a phase of the oscillation voltage command value of q-axis to a phase obtained by advancing the reverse phase of the torque ripple component by the correction phase.

An electric power steering apparatus according to the present disclosure, including:

the controller for AC rotary machine, and an AC rotary electric machine that becomes a driving force source of an steering apparatus of wheels.

Advantage of Invention

According to the controller for AC rotary electric machine or the electric power steering apparatus of the present disclosure, since the oscillation voltage command value of q-axis for canceling the torque ripple component is superimposed on the voltage command value of q-axis, the cancellation current for canceling the torque ripple component can be superimposed on the winding current in feedforward manner. And, since the reverse phase of the torque ripple component is calculated based on the current information which flows through the winding and the magnetic pole position, the phase and its reverse phase of the torque ripple component on the basis of the magnetic pole position which changes according to the winding current can be calculated with good accuracy. Moreover, the correction phase corresponding to the phase delay of the actual current with respect to the oscillation voltage command value of q-axis is calculated, and the phase of the oscillation voltage command value of q-axis is set to a phase obtained by advancing the reverse phase of the torque ripple component by the correction phase. Therefore, the oscillation voltage command value of q-axis in which the phase deviation between the voltage command value, and the winding current and the torque ripple component is compensated is calculated, and the torque ripple component can be canceled with good accuracy.

DETAILED DESCRIPTION OF THE EMBODIMENTS

1. Embodiment 1

Figure 1:
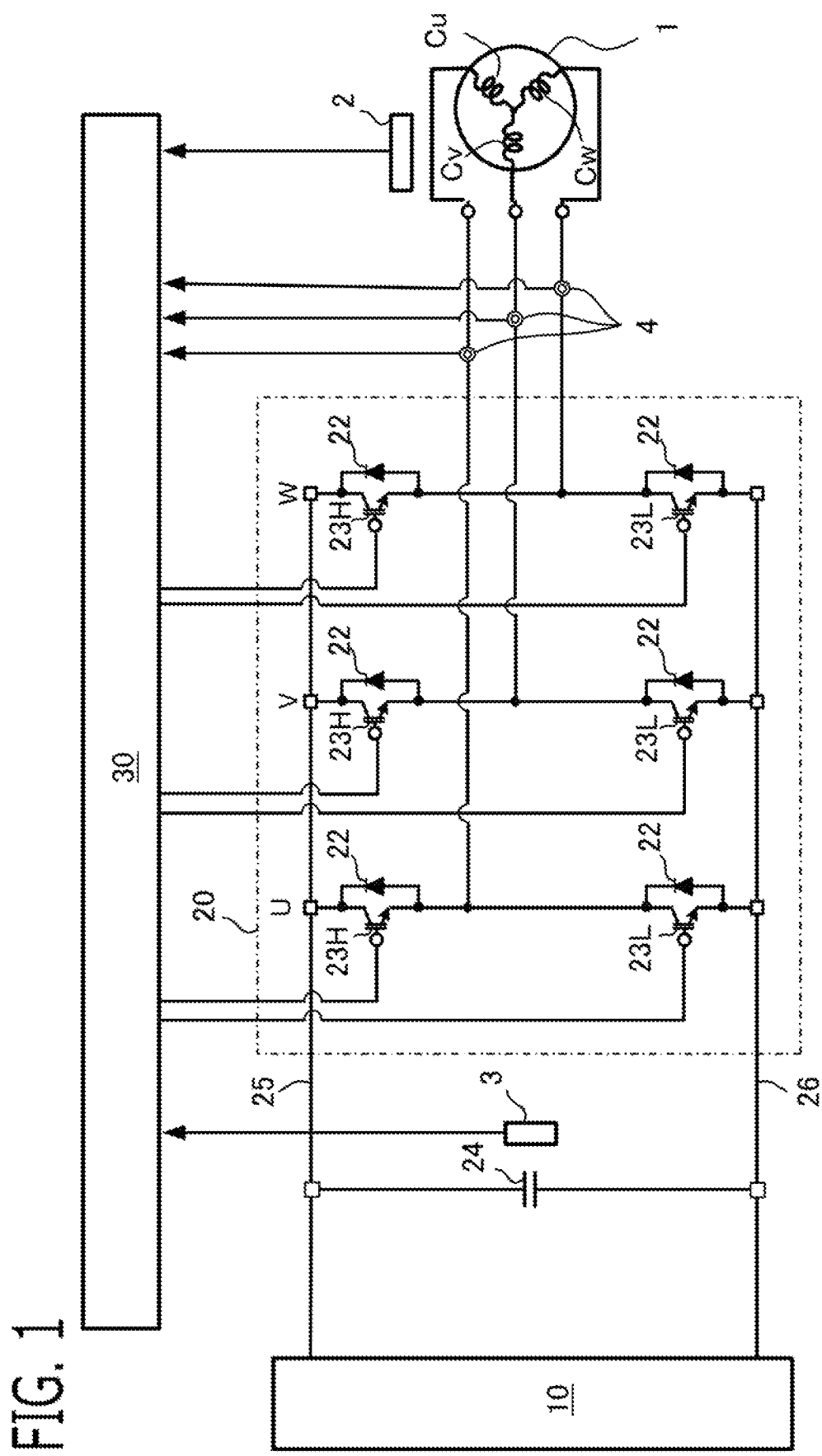
FIG. 1 is a schematic configuration diagram of the AC rotary electric machine and the controller according to Embodiment 1.

A controller for AC rotary electric machine 30 (hereinafter, referred to simply as the controller 30) according to Embodiment 1 will be explained with reference to drawings. FIG. 1 is a schematic configuration diagram of an AC rotary electric machine 1, an inverter 20, and the controller 30 according to the present embodiment.

1-1. AC Rotary Electric Machine

The AC rotary electric machine 1 is a synchronous AC rotary electric machine which is provided with a stator having plural-phase windings, and a rotor. In the present embodiment, three-phase windings Cu, Cv, Cw of U phase, V phase, and W phase are provided in the stator. The three-phase windings Cu, Cv, Cw are connected by star connection. The three-phase windings may be connected by A connection. A permanent magnet is provided in the rotor configured by electromagnetic steel plates, and the AC rotary electric machine 1 is a permanent magnet type synchronous AC rotary electric machine.

The AC rotary electric machine 1 is provided with a rotation sensor 2 which outputs an electric signal according to a rotational angle of the rotor. The rotation sensor 2 is a Hall element, an encoder, or a resolver. An output signal of the rotation sensor 2 is inputted into the controller 30.

1-2. Inverter

The inverter 20 is a power converter which performs power conversion between the DC power source 10 and the three-phase windings, and has a plurality of switching devices. The inverter 20 is provided with three sets of a series circuit (leg) where a positive electrode side switching device 23H (upper arm) connected to the positive electrode side of the DC power source 10 and a negative electrode side switching device 23L (lower arm) connected to the negative electrode side of the DC power source 10 are connected in series, corresponding to respective phase of the three-phase windings. The inverter 20 is provided with a total of six switching devices of the three positive electrode side switching devices 23H, and the three negative electrode side switching devices 23L. Then, a connection node where the positive electrode side switching device 23H and the negative electrode side switching device 23L are connected in series is connected to the winding of the corresponding phase.

Specifically, in the series circuit of each phase, the collector terminal of the positive electrode side switching device 23H is connected to the positive electrode side wire 25, the emitter terminal of the positive electrode side switching device 23H is connected to the collector terminal of the negative electrode side switching device 23L, and the emitter terminal of the negative electrode side switching device 23L is connected to the negative electrode side electric wire 26. The connection node between the positive pole side switching device 23H and the negative pole side switching device 23L is connected to the winding of the corresponding phase. IGBT (Insulated Gate Bipolar Transistor) in which a diode 22 is connected in inverse parallel, MOSFET (Metal Oxide Semiconductor Field Effect Transistor) which has a function of diode connected in inverse parallel, or the like is used for the switching device. A gate terminal of the each switching device is connected to the controller 30. The each switching device is turned on or turned off by the control signal outputted from the controller 30.

A smoothing capacitor 24 is connected between the positive electrode side wire 25 and the negative electrode side wire 26. A power source voltage sensor 3 which detects a power source voltage VDC supplied to the inverter 20 from the DC power source 10 is provided. The power source voltage sensor 3 is connected between the positive electrode side electric wire 25 and the negative electrode side electric wire 26. An output signal of the power source voltage sensor 3 is inputted to the controller 30.

A current sensor 4 outputs an electric signal according to current which flows into the winding of each phase. The current sensor 4 is provided on the each phase wire which connects the series circuit of the switching devices and the winding. An output signal of the current sensor 4 is inputted into the controller 30. The current sensor 4 may be provided in the series circuit of each phase.

A chargeable and dischargeable electricity accumulation device (for example, a lithium ion battery, a nickel hydoride battery, an electrical double layer capacitor) is used for the DC power source 10. A DC-DC converter which is a DC electric power converter which steps up or steps down the DC voltage may be provided in the DC power source 10.

1-3. Controller 30

Figure 2:
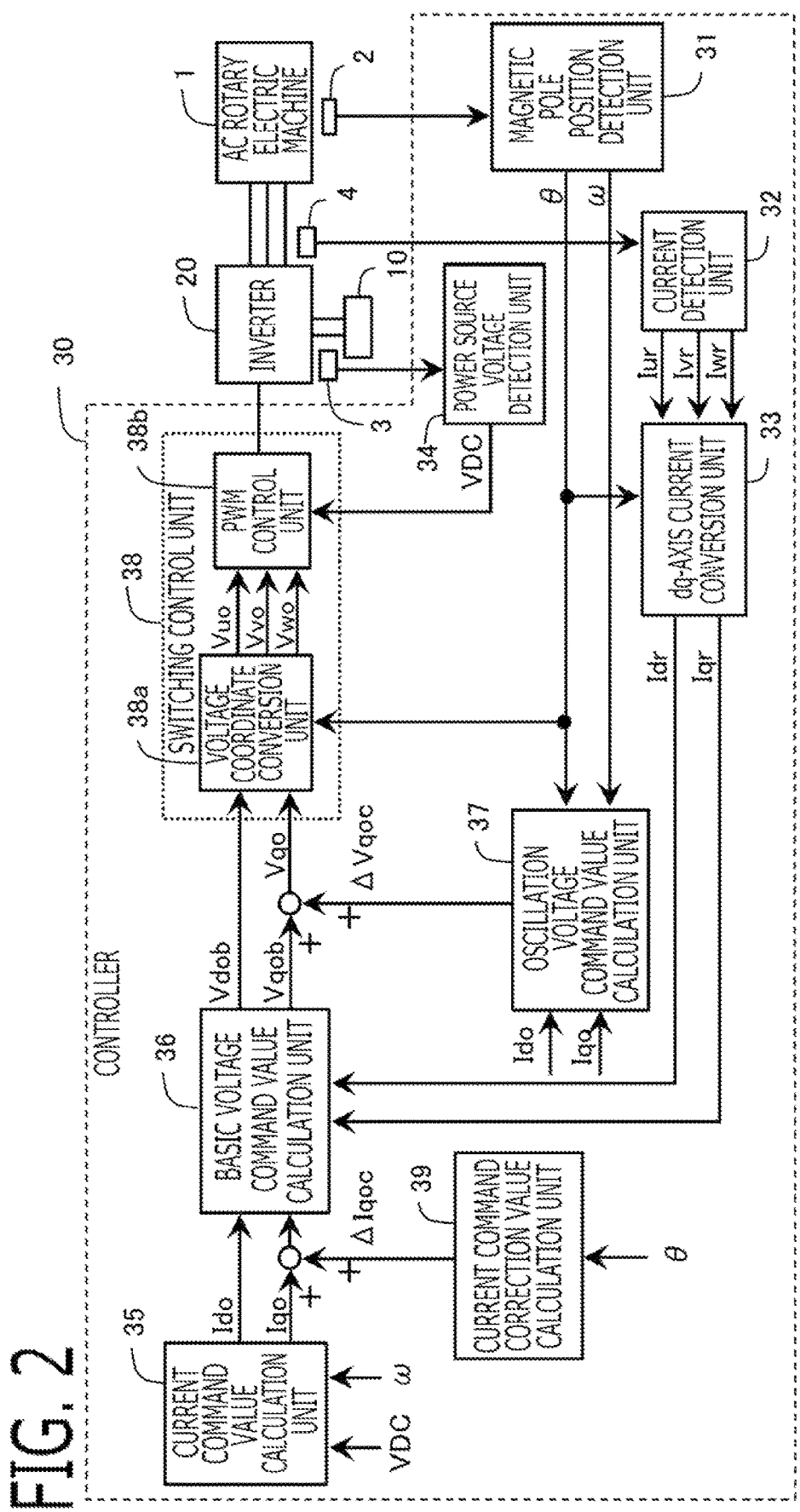
FIG. 2 is a schematic block diagram of the controller for AC rotary electric machine according to Embodiment 1.
Figure 3:
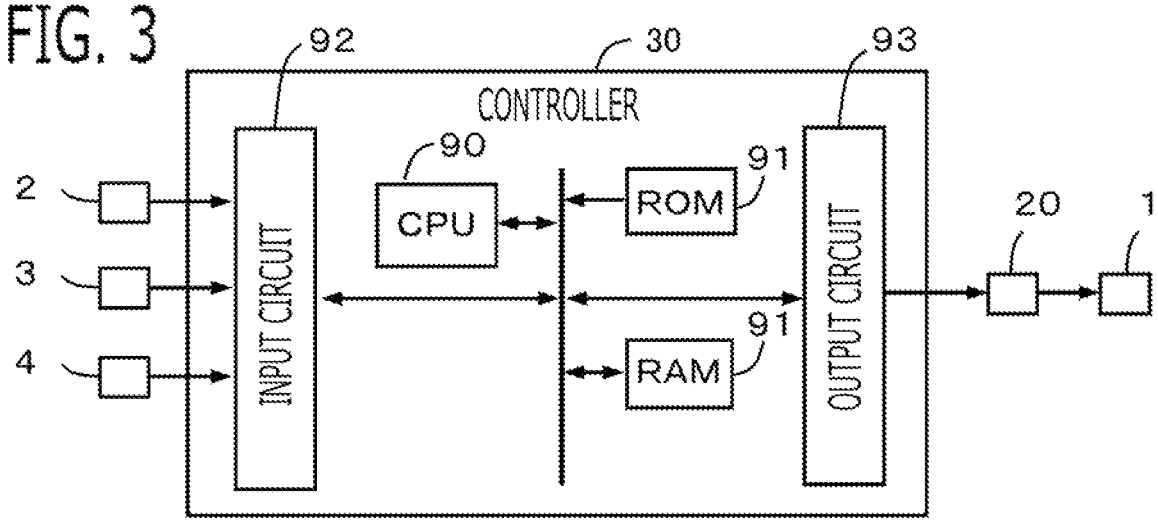
FIG. 3 is a hardware configuration diagram of the controller for AC rotary electric machine according to Embodiment 1.

The controller 30 controls the AC rotary electric machine 1 via the inverter 20. As shown in FIG. 2, the controller 30 is provided with a magnetic pole position detection unit 31, a current detection unit 32, a dq-axis current conversion unit 33, a power source voltage detection unit 34, a current command value calculation unit 35, a basic voltage command value calculation unit 36, an oscillation voltage command value calculation unit 37, a switching control unit 38, a current command correction value calculation unit 39, and the like. Each function of the controller 30 is realized by processing circuits provided in the controller 30. Specifically, as shown in FIG. 3, the controller 30 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches such as the power source voltage sensors 3, the current sensor 4, the rotation sensor 2, and the like, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as a ROM and collaborates with other hardware devices in the controller 30, such as the storage apparatus 91, the input circuit 92, and the output circuit 93, so that the respective functions of the control units 31 to 39 of FIG. 2 provided in the controller 30 are realized. Setting data items such as a current phase setting data, a correction phase setting data, an inductance setting data, a resistance value R of winding, an order N, and an inductance L to be used in the control units 31 to 39 are stored, as part of software items (programs), in the storage apparatus 91 such as a ROM. Each function of the controller 30 will be described in detail below.

1-3-1. Magnetic Pole Position Detection Unit

The magnetic pole position detection unit 31 detects a magnetic pole position θ of the rotor in an electrical angle (a rotational angle θ of the rotor). In the present embodiment, the magnetic pole position detection unit 31 detects the magnetic pole position θ of the rotor (the rotational angle θ), based on the output signal of the rotation sensor 2. In the present embodiment, the magnetic pole position is set to a direction of the N pole of the permanent magnet provided in the rotor. The magnetic pole position detection unit 31 calculates a rotational angle speed ω of the magnetic pole position of the rotor in the electrical angle by performing a differential operation to the magnetic pole position θ.

The magnetic pole position detection unit 31 may estimate the rotational angle (the magnetic pole position) and the rotational angle speed without using the rotation sensor, based on current information which are obtained by superimposing a harmonic wave component on the current command value (so-called, sensorless system).

1-3-2. Current Detection Unit

The current detection unit 32 detects currents Iur, Ivr, Iwr of three-phase which flow into respective phases of the three-phase windings. In the present embodiment, the current detection unit 32 detects currents Iur, Ivr, Iwr of three-phase which flow into respective phases of the three-phase windings Cu, Cv, Cw from the inverter 20, based on the output signal of the current sensor 4. Herein, Iur is a current detection value of U phase, Ivr is a current detection value of V phase, and Iwr is a current detection value of W phase.

1-3-3. dq-axis Current Conversion Unit

The dq-axis current conversion unit 33 converts the current detection values of three-phase Iur, Ivr, Iwr into the current detection value of d-axis Idr and the current detection value of q-axis Iqr on a dq-axis rotating coordinate system. The dq-axis rotating coordinate system is a rotating coordinate system of two-axis which consist of a d-axis defined in the direction of the detected magnetic pole position θ and a q-axis defined in a direction which advanced to the d-axis by 90 degrees in the electrical angle, and it rotates synchronizing with rotation of the magnetic pole position of the rotor. Specifically, the dq-axis current conversion unit 33 converts the current detection values Iur, Ivr, Iwr of three-phase into a current detection value d-axis Idr and a current detection value of q-axis Iqr, by performing a three-phase/two-phase conversion and a rotating coordinate conversion based on the magnetic pole position θ.

1-3-4. Power Source Voltage Detection Unit

The power source voltage detection unit 34 detects a power source voltage VDC supplied to the inverter 20 from the DC power source 10. In the present embodiment, the power source voltage detection unit 34 detects the power source voltage VDC based on the output signal of the power source voltage sensor 3.

1-3-5. Current Command Value Calculation Unit

The current command value calculation unit 35 calculates a current command value of d-axis Ido and a current command value of q-axis Iqo. In the present embodiment, the current command value calculation unit 35 calculates the current command value of d-axis Ido and the current command value of q-axis Iqo, based on a target torque, the power source voltage VDC, the rotational angle speed co, and the like, using the well-known current vector control method, such as the maximum torque/current control, the magnetic flux weakening control, and the Id=0 control. The target torque may be transmitted from an external device, or may be calculated in the controller 30.

In the present embodiment, an oscillation current command value of q-axis ΔIqoc calculated by the current command correction value calculation unit 39 described below is superimposed on the current command value of q-axis Iqo, and the current command value after superposition is calculated as the final current command value of q-axis Iqo (Iqo←Iqo+ΔIqc).

1-3-6. Basic Voltage Command Value Calculation Unit

The basic voltage command value calculation unit 36 calculates a basic voltage command value of d-axis Vdob and a basic voltage command value of q-axis Vqob on the dq-axis rotating coordinate system.

In the present embodiment, the basic voltage command value calculation unit 36 performs a current feedback control which changes the basic voltage command value of d-axis Vdob and the basic voltage command value of q-axis Vqob so that the current detection value of d-axis Idr approaches the current command value of d-axis Ido, and the current detection value of q-axis Iqr approaches the current command value of q-axis Iqo.

For example, the basic voltage command value calculation unit 36 performs a control calculation, such as PI control, based on a d-axis current deviation between the current detection value of d-axis Idr and the current command value of d-axis Ido, and a q-axis current deviation between the current detection value of q-axis Iqr and the current command value of q-axis Iqo; and calculates the basic voltage command value of d-axis Vdob and the basic voltage command value of q-axis Vqob.

1-3-7. Switching Control Unit

The switching control unit 38 controls on/off the plurality of switching devices is provided in the inverter 20, based on the basic voltage command value of d-axis Vdob, and the voltage command value of q-axis Vqo obtained by superimposing the oscillation voltage command value of q-axis ΔVqoc described below on the basic voltage command value of q-axis Vqob. In this example, the voltage command value of q-axis Vqo is calculated by adding the oscillation voltage command value of q-axis ΔVqoc to the basic voltage command value of q-axis Vqob (Vqo=Vqob+ΔVqoc).

The voltage coordinate conversion unit 38a calculates the voltage command values of three-phase Vuo, Vvo, Vwo by performing a fixed coordinate conversion and a two-phase/three-phase conversion to the basic voltage command value of d-axis Vdob and the voltage command value of q-axis Vqo, based on the magnetic pole position θ.

The PWM control unit 38b compares each of the voltage command values of three-phase Vuo, Vvo, Vwo with a carrier wave (a triangular wave) which oscillates with an amplitude of the power source voltage VDC/2 centering on 0 at a carrier frequency; and turns on a rectangular pulse wave when the voltage command value exceeds the carrier wave, and turns off the rectangular pulse wave when the voltage command value is below the carrier wave. The PWM control unit 38b outputs control signals according to the rectangular pulse waves of three-phase to the inverter 20, and turns on and off each switching device of the inverter 20. A short circuit prevention time (a dead time) in which both of the positive electrode side switching device and the negative electrode side switching device are turned off at the same time may be provided between the on period of the positive electrode side switching device and the on period of the negative electrode side switching device of each phase, so that the positive electrode side switching device and the negative electrode side switching device of each phase are not turned on at the same time.

1-3-8. Oscillation Voltage Command Value Calculation Unit

<Problem of Cancellation of Torque Ripple Component by Current Command Value>

In the AC rotary electric machine, a torque constant (ratio of torque and current) may be fluctuated according to the magnetic pole position θ, due to the spatial harmonic resulting from the magnetic saturation and the like. Especially, in the cheap AC rotary electric machine whose countermeasure to fluctuation of the torque constant is not sufficient, this trend becomes large. Due to this fluctuation of the torque constant, a torque ripple component is superimposed on output torque. The torque ripple component due to fluctuation of the torque constant does not appear in the current detection value. Therefore, in order to cancel the torque ripple component, it is necessary to superimpose a current oscillation component for canceling the torque ripple component on the winding current in feedforward manner.

However, since the torque ripple component is a harmonic wave component (for example, 6th order) of the rotational frequency of the magnetic pole position θ, the frequency of the torque ripple component increases as the rotational angle speed of the rotor (the magnetic pole position) increases. Accordingly, even if a cancellation current oscillation component is superimposed on the current command value, when the rotational angle speed becomes high, the frequency of the current oscillation component becomes higher than the cutoff frequency of current feedback control, and the actual winding current cannot follow the current oscillation component of the current command value. Therefore, by the method for superimposing the cancellation current oscillation component on the current command value, the cancellation current oscillation component cannot be superimposed on the winding current, and the torque ripple component cannot be canceled in the high speed region.

<Theoretical Explanation of Cancellation of Torque Ripple Component by Voltage Command Value>

Then, in the present embodiment, a cancellation voltage oscillation component is superimposed on the voltage command value after processing of the current feedback control. According to this configuration, the cancellation current oscillation component can be superimposed on the winding current, without being affected by the cutoff frequency of the current feedback control. However, since there is a deviation of phase and amplitude between the voltage command value, and the winding current and the torque ripple component, it is necessary to calculate the cancellation voltage oscillation component in which the deviation is considered. In the following, the theory for it will be explained.

The torque equation of the AC rotary electric machine becomes like the next equation.

$$T = Pm \cdot \varphi Iq + Pm \cdot (Ld - Lq) \cdot Id \cdot Iq \quad (1)$$

Herein, T is an output torque of the rotor, Pm is a number of pole pairs, ψ is an interlinkage flux, Ld is an inductance of d-axis, and Lq is an inductance of q-axis.

It is found from the equation (1) that the output torque T changes according to the q-axis current Iq and the d-axis current Id. Usually, the right side second term of the equation (1) is smaller than the right side first term, and the output torque T changes in proportion to the q-axis current Iq in general. The torque ripple component mentioned above is caused by fluctuation of the interlinkage flux ψ according to the magnetic pole position θ, and the torque constant becomes Pm×ψ in general.

If an order of the frequency of the torque ripple component with respect to the rotational frequency of the magnetic pole position is set to N, the torque ripple component ΔT can be expressed by the next equation.

$$\Delta T = Trp0 \cdot \cos\{(N \cdot \theta - \theta rp0)\} \quad (2)$$

$$Trp0 = f(Id, Iq)$$

$$\theta rp0 = f(Id, Iq)$$

Herein, Trp0 is an amplitude of the torque ripple component, θrp0 is a phase of the torque ripple component with respect to an N times value of the magnetic pole position θ. The phase θrp0 of the torque ripple component is not a phase in the rotation period of the magnetic pole position θ, but it is a phase in the period of the torque ripple component.

The amplitude Trp0 and the phase θrp0 of the torque ripple component change according to the d-axis current Id and the q-axis current Iq, and become functions of these. The waveform of the torque ripple component ΔT is obtained by the electromagnetic field analysis or the actual measurement, at each operating point of the d-axis current Id and the q-axis current Iq, and the relation characteristic among the amplitude Trp0, the d-axis current Id, and the q-axis current Iq, and the relation characteristic among the phase θrp0, the d-axis current Id, and the q-axis current Iq are identified.

A cancellation q-axis current ΔIqc for canceling the torque ripple component ΔT of the equation (2) becomes as the next equation.

$$\Delta Iqc = -Iqrp0 \cdot \cos(N \cdot \theta - \theta rp0) = Iqrp0 \cdot \cos(N \cdot \theta - \theta rp0 - \pi) \quad (3)$$

$$Iqrp0 = \frac{Trp0}{Pm \cdot \varphi} = f(Id, Iq)$$

Herein, Iqrp0 is an amplitude of the cancellation q-axis current ΔIqc, and it becomes a value obtained by dividing the amplitude Trp0 of the torque ripple component by the number Pm of pole pairs and the interlinkage flux ψ. The interlinkage flux ψ of the equation (3) is the average value in which the fluctuation according to the magnetic pole position is not considered. The phase of the cancellation q-axis current ΔIqc becomes the reverse phase of the torque ripple component ΔT, and the amplitude of the cancellation q-axis current ΔIqc becomes a 1/(Pm×ψ) times value of the amplitude of the torque ripple component ΔT. Similar to the amplitude Trp0 of the torque ripple component, the amplitude Iqrp0 of the cancellation q-axis current changes according to the d-axis current Id and the q-axis current Iq, and become a function of these.

Next, the conversion from the cancellation q-axis current ΔIqc to the voltage command value will be explained. The voltage equation of the AC rotary electric machine becomes like the next equation.

$$\begin{bmatrix} Vd \\ Vq \end{bmatrix} = \begin{bmatrix} R + p \cdot Ld & -\omega \cdot Lq \\ \omega \cdot Ld & R + p \cdot Lq \end{bmatrix} \begin{bmatrix} Id \\ Iq \end{bmatrix} + \begin{bmatrix} 0 \\ \omega \cdot \varphi a \end{bmatrix} \quad (4)$$

Herein, Vd is a d-axis voltage, Vq is a q-axis voltage, R is a resistance value of winding, ψa is an interlinkage flux by the permanent magnet, and p is a differential operator.

If the q-axis current Iq+ΔIq on which the cancellation q-axis current ΔIqc is superimposed is substituted for the q-axis current Iq of the equation (4), the next equation is obtained. The d-axis current is not changed for canceling the torque ripple component.

$$\begin{bmatrix} Vd + \Delta Vdc \\ Vq + \Delta Vqc \end{bmatrix} = \begin{bmatrix} R + p \cdot Ld & -\omega \cdot Lq \\ \omega \cdot Lq & R + p \cdot Lq \end{bmatrix} \begin{bmatrix} Id \\ Iq + \Delta Iqc \end{bmatrix} + \begin{bmatrix} 0 \\ \omega \cdot \varphi a \end{bmatrix} \quad (5)$$

If the equation (4) is subtracted from the equation (5), the next equation which converts the cancellation q-axis current ΔIqc into a cancellation q-axis voltage ΔVqc and a cancellation d-axis voltage ΔVdc is obtained.

$$\begin{bmatrix} \Delta Vdc \\ \Delta Vqc \end{bmatrix} = \begin{bmatrix} R + p \cdot Ld & -\omega \cdot Lq \\ \omega \cdot Lq & R + p \cdot Lq \end{bmatrix} \begin{bmatrix} 0 \\ \Delta Iqc \end{bmatrix} = \begin{bmatrix} -\omega \cdot Lq \cdot \Delta Iqc \\ (R + p \cdot Lq) \cdot \Delta Iqc \end{bmatrix} \quad (6)$$

In the present embodiment, the term of the cancellation d-axis voltage ΔVdc (−ω×Lq×ΔIq) is ignored. If the equation (3) is substituted for the term of the cancellation q-axis voltage ΔVqc of the equation (6), the next equation is obtained.

$$\Delta Vqc = Iqrp0 \cdot \{R \cdot \cos(N \cdot \theta - \theta rp0 - \pi) - N \cdot \omega \cdot Lq \cdot \sin(N \cdot \theta - \theta rp0 - \pi)\} \quad (7)$$

If the equation (7) is modified by composition of trigonometric function, it can be expressed like the next equation.

$$\Delta Vqc = \beta r \cdot Iqrp0 \cdot \cos(N \cdot \theta - \theta rp0 - \pi + \alpha r) \quad (8)$$

$$\beta r = \sqrt{R^2 + (N \cdot \omega \cdot Lq)^2}$$

$$\alpha r = \arctan\left(\frac{N \cdot \omega \cdot Lq}{R}\right)$$

Herein, arctan is an arc tangent function. From the equation (8), the amplitude of the cancellation q-axis voltage ΔVqc becomes a theoretical amplitude gain βr times value of the amplitude of the cancellation q-axis current ΔIqc of the equation (3), and the phase of the cancellation q-axis voltage ΔVqc becomes a phase advanced to the phase of the cancellation q-axis current ΔIqc by the theoretical leading phase αr.

Figure 4:
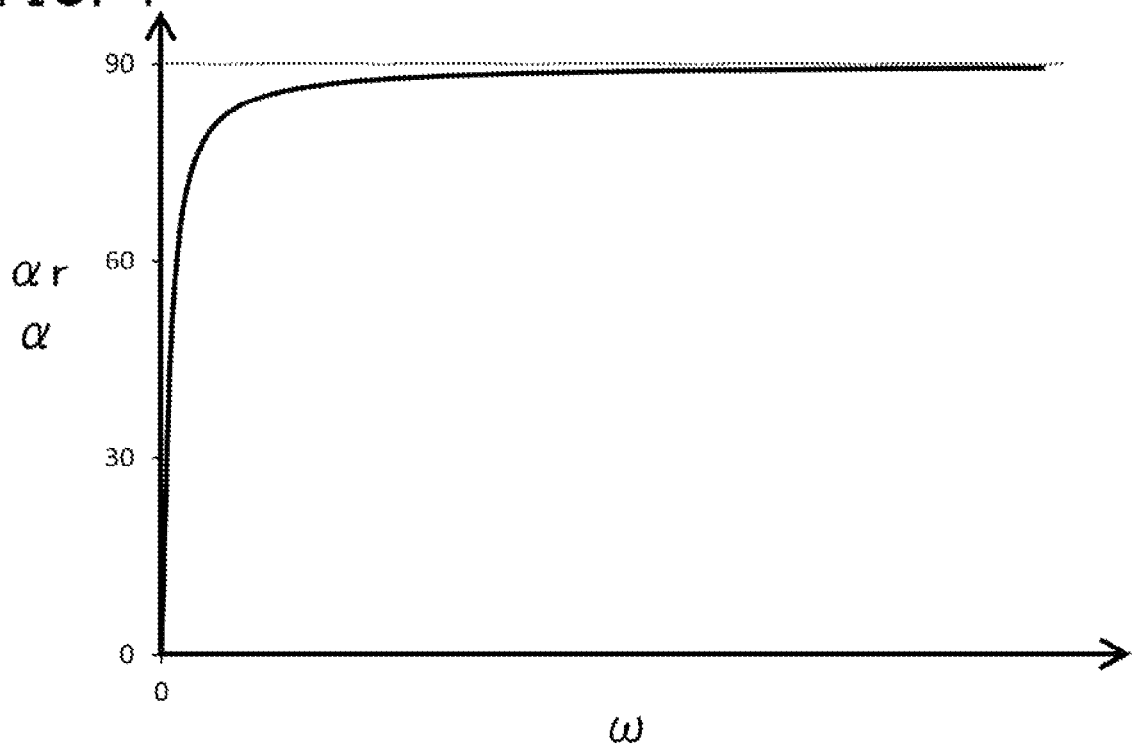
FIG. 4 is a figure for explaining the theoretical leading phase and the correction phase according to Embodiment 1.

The theoretical leading phase αr becomes a positive/negative reversing value of the phase delay of the q-axis current Iq with respect to the q-axis voltage Vq applied to the winding, and becomes a positive value. The theoretical leading phase αr is the so-called impedance angle. The theoretical amplitude gain βr becomes a reciprocal of the amplitude gain of the q-axis current Iq with respect to the q-axis voltage Vq applied to the winding. As shown in FIG. 4, as the rotational angle speed ω of the magnetic pole position increases from 0, the theoretical leading phase αr increases from 0 to 90 degrees (π/2).

<Calculation of Oscillation Voltage Command Value of q-Axis ΔVqoc>

Then, the oscillation voltage command value calculation unit 37 calculates an oscillation voltage command value of q-axis ΔVqoc which has the same frequency as the torque ripple component superimposed on the output torque of the rotor, and which is for canceling a torque ripple component. The oscillation voltage command value calculation unit 37 calculates a reverse phase of the torque ripple component, based on a current information which flow through the winding, and the magnetic pole position θ; calculates a correction phase α, in a period of the oscillation voltage command value of q-axis ΔVqoc, which corresponds to a phase delay of an actual current with respect to the oscillation voltage command value of q-axis ΔVqoc; and sets a phase of the oscillation voltage command value of q-axis ΔVqoc to a phase obtained by advancing the reverse phase of the torque ripple component by the correction phase α.

According to this configuration, since the oscillation voltage command value of q-axis ΔVqoc for canceling the torque ripple component is superimposed on the voltage command value of q-axis Vqo, it is not cut off by the cutoff frequency of the current feedback control in the high speed region, the cancellation current can be superimposed on the winding current, and the torque ripple component can be canceled.

And, since the reverse phase of the torque ripple component is calculated based on the current information which flows through the winding and the magnetic pole position θ, the phase and its reverse phase of the torque ripple component, on the basis of the magnetic pole position θ, which changes according to the winding current can be calculated with good accuracy. Moreover, the correction phase α corresponding to the phase delay of the actual current with respect to the oscillation voltage command value of q-axis ΔVqoc is calculated, and the phase of the oscillation voltage command value of q-axis ΔVqoc is set to a phase obtained by advancing the reverse phase of the torque ripple component by the correction phase α. Therefore, the oscillation voltage command value of q-axis ΔVqoc in which the phase deviation between the voltage command value, and the winding current and the torque ripple component is compensated is calculated, and the torque ripple component can be canceled with good accuracy.

Figure 5:
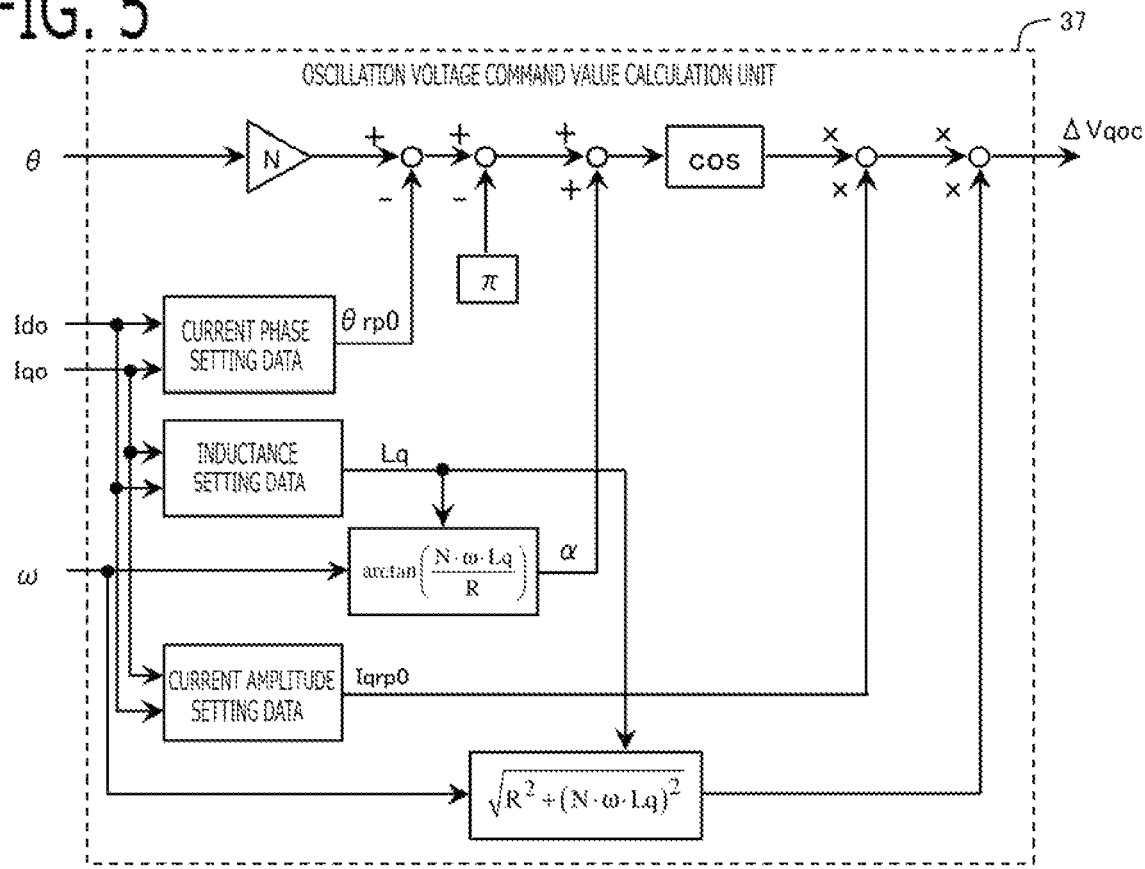
FIG. 5 is a block diagram of the oscillation voltage command value calculation unit according to Embodiment 1.

In the present embodiment, the oscillation voltage command value calculation unit 37 calculates the oscillation voltage command value of q-axis ΔVqoc using the next equation. FIG. 5 shows a block diagram of the oscillation voltage command value calculation unit 37 according to the present embodiment.

$$\Delta Vqoc = \beta \cdot Irp0 \cdot \cos(N \cdot \theta - \theta rp0 - \pi + \alpha) \quad (9)$$

In the equation (9), (N×θ−θrp0−π) becomes the reverse phase of the torque ripple component, α becomes the correction phase, and (B×Iqrp0) becomes the amplitude.

<Calculation of Reverse Phase of Torque Ripple Component>

As shown in the equation (9), the oscillation voltage command value calculation unit 37 calculates the reverse phase (N×θ−θrp0−π) of the torque ripple component by subtracting the phase θrp0 of the torque ripple component with respect to a multiplication value of the magnetic pole position θ and the order N, from the multiplication value of the magnetic pole position θ and the order N, and subtracting (or adding) π (180 degrees).

Herein, the oscillation voltage command value calculation unit 37 calculates the phase θrp0 of the torque ripple component, based on the current information which flows into the winding. In the present embodiment, by referring to a current phase setting data in which a relationship among the d-axis current Id, the q-axis current Iq, and the phase θrp0 of the torque ripple component is preliminarily set, the oscillation voltage command value calculation unit 37 calculates the phase θrp0 of the torque ripple component corresponding to the present current command value of d-axis Ido and the present current command value of q-axis Iqo. Instead of the current command value of d-axis Ido and the current command value of q-axis Iqo, the current detection value of d-axis Idr and the current detection value of q-axis Iqr may be used.

The current phase setting data is a map data or an approximation function. As mentioned above, the waveform of the torque ripple component ΔT is obtained by the electromagnetic field analysis or the actual measurement, at each operating point of the d-axis current Id and the q-axis current Iq; and the current phase setting data is preliminarily set based on the obtained data.

<Calculation of Correction Phase α>

In the present embodiment, using the next equation similar to the calculation equation of the theoretical leading phase αr of the third equation of the equation (8), the oscillation voltage command value calculation unit 37 calculates the correction phase α, based on the order N of the frequency of the torque ripple component with respect to the rotational frequency of the magnetic pole position, the rotational angle speed ω in the electrical angle of the magnetic pole position, the inductance L of the AC rotary electric machine, and the resistance value R of the winding.

$$\alpha = \arctan\left(\frac{N \cdot \omega \cdot L}{R}\right) \quad (10)$$

The order N is set to a fixed value of natural number, for example, is set to 6 (N=6). The resistance value R of the winding may be set to a fixed value, and may be changed according to the winding temperature and the like.

In the present embodiment, the inductance L is set to the q-axis inductance Lq. The q-axis inductance Lq may be set to a fixed value, and may be changed according to the current information and the like, as described later.

Alternatively, by referring to a correction phase setting data in which a relationship among the rotational angle speed ω, the inductance L (in this example, the q-axis inductance Lq), and the correction phase α is preliminarily set, the oscillation voltage command value calculation unit 37 may calculate the correction phase α corresponding to the present rotational angle speed ω and the present inductance L. Alternatively, without considering change of the inductance L, by referring to a correction phase setting data in which a relationship between the rotational angle speed ω and the correction phase α is preliminarily set, the oscillation voltage command value calculation unit 37 may calculate the correction phase α corresponding to the present rotational angle speed ω. The correction phase setting data is preliminarily set based on the equation (10) or experimental data. The correction phase setting data is a map data or an approximation function.

In any case, as shown in FIG. 4, as the rotational angle speed ω of the magnetic pole position decreases, the oscillation voltage command value calculation unit 37 reduces the correction phase α in the period of the oscillation voltage command value of q-axis, within a range from 90 degrees to 0 degree.

<Setting of inductance L according to current>
By Referring an Inductance Setting Data in which a Relationship among the d-axis current, the q-axis current, and the q-axis inductance Lq, the oscillation voltage command value calculation unit 37 may calculate the q-axis inductance Lq corresponding to the present current command values of d-axis and q-axis Ido, Iqo, or the present current detection values of d-axis and q-axis Idr, Iqr.

The inductance setting data is preliminarily set based on data obtained by the electromagnetic field analysis or the actual measurement. For example, an inclination Δψ/ΔIq of change Δψ of the interlinkage flux with respect to change ΔIq of the q-axis current is calculated, at each operating point of the d-axis current and the q-axis current; and the inclination Δψ/ΔIq is set as the q-axis inductance Lq.

Figure 6:
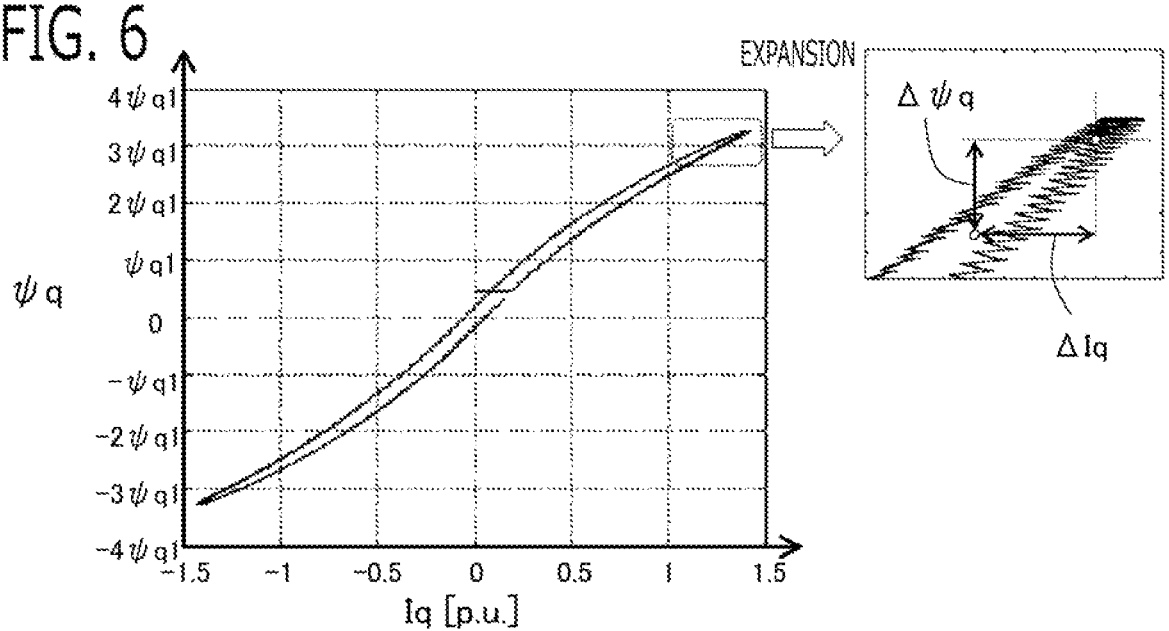
FIG. 6 is a figure for explaining the relation between the interlinkage flux of q-axis and the q-axis current according to Embodiment 1.

FIG. 6 shows an example of the relation characteristic between the interlinkage flux ψq of q-axis and the q-axis current Iq when the q-axis current Iq is swept at a certain operating point of the d-axis current Id. This characteristics is obtained by the electromagnetic field analysis or the actual measurement. In FIG. 6, the operating point near Iq=1.35 [p.u.] is expanded. At this operating point, a minute change Δψq of the interlinkage flux of q-axis with respect to a minute change ΔIq of the q-axis current Iq is obtained, and the inclination Δψ/ΔIq is obtained. Then, the inclination Δψ/ΔIq is obtained as the q-axis inductance Lq at that operating point. In FIG. 6, the interlinkage flux ψq of q-axis is made dimensionless by ψq1 which is set to a fixed value.

Figure 7:
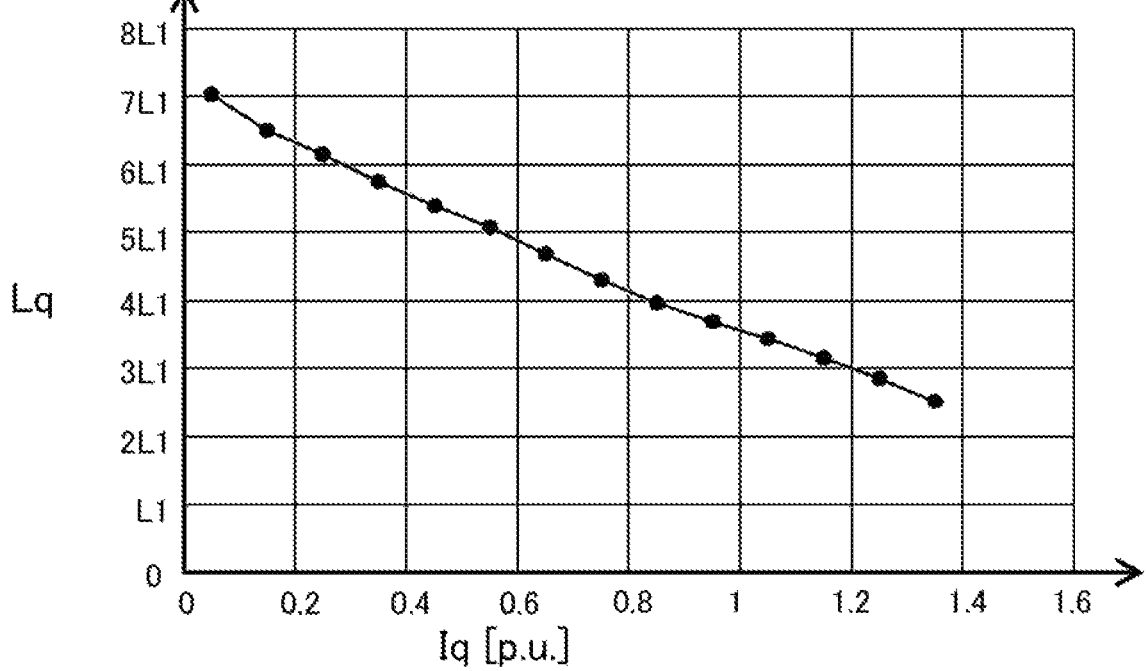
FIG. 7 is a figure for explaining the relation between the q-axis current and q-axis inductance value according to Embodiment 1.

FIG. 7 is a figure which plots the q-axis inductance Lq (the inclination Δψ/ΔIq) obtained at each operating point of the q axis current Iq. The q-axis inductance Lq is made dimensionless by L1 which is set to a fixed value. The q-axis inductance Lq is 2.5×L1 at Iq=1.35 [p.u.] expanded in FIG. 6. The q-axis inductance Lq is 7×L1 at Iq=0.05 [p.u.]. The q-axis inductance Lq is 5×L1 at Iq=0.55 [p.u.]. In the example of FIG. 7, the q-axis inductance Lq decreases as the q-axis current Iq increases. This is because the relation characteristic between the interlinkage flux ψq of q-axis and the q-axis current Iq is not a straight line due to the influence of magnetic saturation, and the inclination changes according to the q-axis current Iq. Especially, in the region where the q-axis current Iq is large, the inclination decreases and the q-axis inductance Lq decreases. Therefore, even in the case of the AC rotary electric machine whose inductance is fluctuated by magnetic saturation according to the winding current, the setting accuracy of inductance can be improved.

<Calculation of Amplitude of Oscillation Voltage Command Value of q-Axis>

The oscillation voltage command value calculation unit 37 calculates the amplitude Iqrp0 of the current of q-axis for canceling the torque ripple component, based on the current information which flows through the winding. In the present embodiment, by referring a current amplitude setting data in which a relationship among the d-axis current Id, the q-axis current Iq, and the amplitude Iqrp0 of the current of q-axis is preliminarily set, the oscillation voltage command value calculation unit 37 calculates the amplitude Iqrp0 of the current of q-axis corresponding to the present current command value of d-axis Ido and the present current command value of q-axis Iqo. Instead of the current command value of d-axis Ido and the current command value of q-axis Iqo, the current detection value of d-axis Idr and the current detection value of q-axis Iqr may be used.

The current amplitude setting data is a map data or an approximation function. As mentioned above, the waveform of the torque ripple component ΔT is obtained by the electromagnetic field analysis or the actual measurement, at each operating point of the d-axis current Id and the q-axis current Iq; and the amplitude Iqrp0 of the current of q-axis is calculated by dividing the amplitude Trp0 of obtained torque ripple component ΔT by the number Pm of pole pairs and the interlinkage flux ψ, the current amplitude setting data is preliminarily set using the calculated amplitude Iqrp0 of the current of q-axis.

Using the next equation similar to the calculation equation of the theoretical amplitude gain βr of the second equation of the equation (8), the oscillation voltage command value calculation unit 37 calculates the amplitude gain β, based on the order N of the frequency of the torque ripple component with respect to the rotational frequency of the magnetic pole position, the rotational angle speed ω in the electrical angle of the magnetic pole position, the inductance L of the AC rotary electric machine, and the resistance value R of the winding. Then, as shown in the equation (9), the oscillation voltage command value calculation unit 37 set a multiplication value (β×Iqrp0) of the amplitude Iqrp0 of the current of q-axis and the amplitude gain β, as the amplitude of the oscillation voltage command value of q-axis ΔVqoc.

$$\beta = \sqrt{R^2 + (N \cdot \omega \cdot L)^2} \tag{11}$$

In the present embodiment, as the order N, the inductance L, and the resistance value R, the same values as the case of the correction phase α of the equation (10) mentioned above are used. As the inductance L, the q-axis inductance Lq is used.

Alternatively, by referring to an amplitude gain setting data in which a relationship among the rotational angle speed ω, the inductance L (in this example, the q-axis inductance Lq), and the amplitude gain β is preliminarily set, the oscillation voltage command value calculation unit 37 may calculate the amplitude gain β corresponding to the present rotational angle speed ω and the present inductance L. Alternatively, without considering change of the inductance L, by referring to an amplitude gain setting data in which a relationship between the rotational angle speed ω and the amplitude gain β is preliminarily set, the oscillation voltage command value calculation unit 37 may calculate the amplitude gain β corresponding to the present rotational angle speed ω. The amplitude gain setting data is preliminarily set based on the equation (11) or experimental data. The amplitude gain setting data is a map data or an approximation function.

In any case, as the rotational angle speed ω of the magnetic pole position increases, the oscillation voltage command value calculation unit 37 increases the amplitude of the oscillation voltage command value of q-axis ΔVqoc. And, as the inductance L increases, the oscillation voltage command value calculation unit 37 increases the amplitude of the oscillation voltage command value of q-axis.

1-3-9. Current Command Correction Value Calculation Unit

As mentioned above, in the present embodiment, the case where the torque ripple component is caused by fluctuation of the torque constant is supposed, and the torque ripple component does not appear in the current detection value. Therefore, if the voltage oscillation component for canceling the torque ripple component is superimposed on the winding voltage, the winding current detection value oscillates. Then, in the low rotation speed region where the frequency of the torque ripple component becomes lower than the cutoff frequency of the current feedback control, oscillation of winding current is suppressed by the current feedback control, and the cancellation effect of the torque ripple component is reduced. Therefore, in the low rotation speed region, by superimposing the current oscillation component for canceling the torque ripple component on the current command value, it is required that the oscillation of winding current is not suppressed.

Then, the current command correction value calculation unit 39 calculates the oscillation current command value of q-axis $\Delta Iqoc$ which has the same frequency as the torque ripple component $\Delta T$ and becomes a reverse phase of the torque ripple component, and which is for canceling the torque ripple component. Then, as mentioned above, the oscillation current command value of q-axis $\Delta Iqoc$ is superimposed on the current command value of q-axis Iqo.

In the present embodiment, the current command correction value calculation unit 39 calculates the oscillation current command value of q-axis $\Delta Iqoc$ using the next equation.

$$\Delta Iqoc = Iqrp0 \cdot \cos(N \cdot \theta - \theta rp0 - \pi) \qquad (12)$$

In the equation (12), $(N \times \theta - \theta rp0 - \pi)$ becomes the reverse phase of the torque ripple component, and Iqrp0 becomes the amplitude.

The phase $\theta rp0$ of the torque ripple component and the amplitude Iqrp0 of the current of q-axis are calculated by the same method as the oscillation voltage command value calculation unit 37. In the present embodiment, the values calculated in the oscillation voltage command value calculation unit 37 are used.

When the rotational angle speed $\omega$ of the magnetic pole position is lower than a speed threshold value which is set corresponding to the cutoff frequency of the current feedback control, the current command correction value calculation unit 39 may calculate the oscillation current command value of q-axis $\Delta Iqoc$ as mentioned above, and may superimpose it on the current command value of q-axis Iqo. When the rotational angle speed $\omega$ is higher than the speed threshold value, the current command correction value calculation unit 39 may not calculate the oscillation current command value of q-axis $\Delta Iqoc$, and may not superimpose it on the current command value of q-axis Iqo.

On the contrary, when the rotational angle speed $\omega$ of the magnetic pole position is higher than the speed threshold value which is set corresponding to the cutoff frequency of the current feedback control, the oscillation voltage command value calculation unit 37 may calculate the oscillation voltage command value of q-axis $\Delta Vqoc$, and may superimpose it on the voltage command value of q-axis Vqo. When the rotational angle speed $\omega$ is lower than the speed threshold value, the oscillation voltage command value calculation unit 37 may not calculate the oscillation voltage command value of q-axis $\Delta Vqoc$, and may not superimpose it on the voltage command value of q-axis Vqo.

In the vicinity of the cutoff frequency of the current feedback control, both of superposition of the current command value of q-axis Iqo and superposition of the voltage command value of q-axis Vqo may be performed.

2. Embodiment 2

Figure 8:
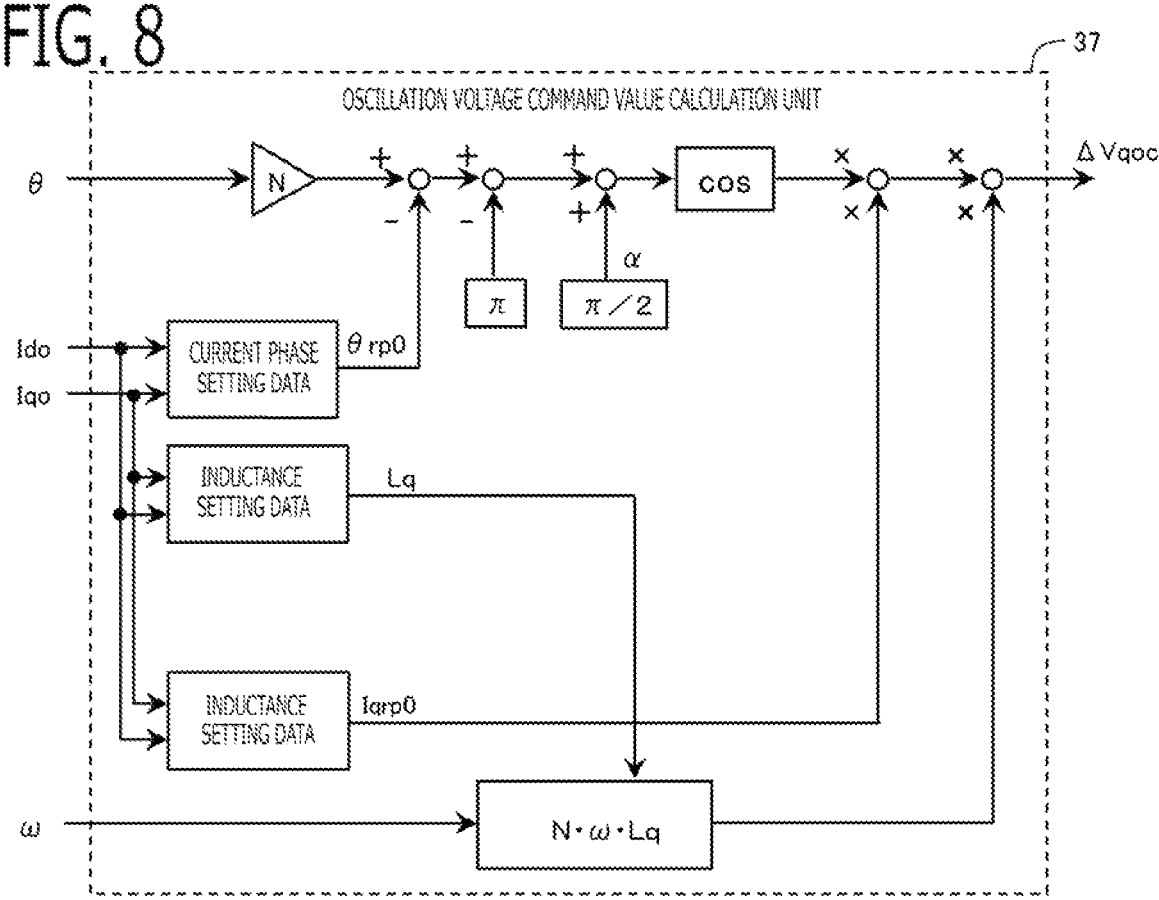
FIG. 8 is a block diagram of the oscillation voltage command value calculation unit according to Embodiment 2.

Next, the controller 30 according to Embodiment 2 will be explained. The explanation for constituent parts the same as those in Embodiment 1 will be omitted. The basic configuration and processing of the AC rotary electric machine 1 and the controller 30 according to the present embodiment is the same as that of Embodiment 1. The setting method of the correction phase $\alpha$ and the amplitude gain $\beta$ in the oscillation voltage command value calculation unit 37 is different from Embodiment 1. FIG. 8 is a block diagram of the oscillation voltage command value calculation unit according to the present embodiment.

<Setting of Correction Phase $\alpha$>

As shown in FIG. 4, as the rotational angle speed $\omega$ increases, the theoretical leading phase $\alpha r$ approaches $\pi/2$ (90 degrees). Then, in the high rotation speed region where the frequency of the torque ripple component becomes higher than the cutoff frequency of the current feedback control, even if the cancellation current oscillation component is superimposed on the current command value, the cancellation current oscillation component cannot be superimposed on the winding current, and it is necessary to superimpose the cancellation voltage oscillation component on the voltage command value. Then, in the present embodiment, importance is attached to the case where the rotational angle speed $\omega$ is high.

Then, in the present embodiment, the oscillation voltage command value calculation unit 37 sets the correction phase $\alpha$ in the period of the oscillation voltage command value of q-axis $\Delta Vqoc$ to $\pi/2$ (90 degrees) ($\alpha = \pi/2$).

According to this configuration, in the high speed region where it is necessary to superimpose the cancellation voltage oscillation component on the voltage command value, utilizing the fact that the theoretical leading phase $\alpha r$ approaches 90 degrees, the control system can be simplified. As shown in FIG. 4, when the rotational angle speed $\omega$ increases from 0, the theoretical leading phase $\alpha r$ approaches 90 degrees rapidly. Therefore, when the rotational angle speed $\omega$ increases to some degrees, the correction errors can be lowered even if the correction phase $\alpha$ is set to $\pi/2$ (90 degrees).

When the rotational angle speed $\omega$ of the magnetic pole position is higher than a start threshold value, the oscillation voltage command value calculation unit 37 may calculate the oscillation voltage command value of q-axis $\Delta Vqoc$ as mentioned above, and may superimpose it on the voltage command value of q-axis Vqo. When the rotational angle speed $\omega$ is lower than the start threshold value, the oscillation voltage command value calculation unit 37 may not calculate the oscillation voltage command value of q-axis $\Delta Vqoc$, and may not superimpose it on the voltage command value of q-axis Vqo. The start threshold value is set to the rotational angle speed $\omega$ at which the difference between the theoretical leading phase $\alpha r$ and $\pi/2$ (90 degrees) becomes a permissible difference (for example, 10 degrees).

<Calculation of Amplitude of Oscillation Voltage Command Value of Q-axis>

As shown in the second equation of the equation (8), as the rotational angle speed $\omega$ increases, $(N \times \omega \times L)^2$ becomes large with respect to $R^2$, and the theoretical amplitude gain $\beta r$ approaches $N \times \omega \times L$.

Then, in the present embodiment, as shown in the next equation, the oscillation voltage command value calculation unit 37 calculates a multiplication value of the order N of the frequency of the torque ripple component with respect to the rotational frequency of the magnetic pole position, the rotational angle speed $\omega$ in the electrical angle of the magnetic pole position, and the inductance L of the AC rotary electric machine, as the amplitude gain $\beta$. The inductance L is set to the q-axis inductance Lq, and it may be changed according to the current information and the like, similar to Embodiment 1.

$$\beta = N \cdot \omega \cdot L \tag{13}$$

Similar to Embodiment 1, the oscillation voltage command value calculation unit 37 calculates the amplitude Iqrp0 of the current of q-axis for canceling the torque ripple component, based on the current information which flows through the winding. Then, as shown in the equation (9), the oscillation voltage command value calculation unit 37 set a multiplication value of the amplitude Iqrp0 of the current of q-axis and the amplitude gain β, as the amplitude of the oscillation voltage command value of q-axis ΔVqoc.

According to this configuration, in the high speed region where it is necessary to superimpose the cancellation voltage oscillation component on the voltage command value, utilizing the fact that the amplitude gain β approaches N×ω×L, the control system can be simplified.

Accordingly, the oscillation voltage command value calculation unit 37 increases the amplitude of the oscillation voltage command value of q-axis ΔVqoc in proportion to the rotational angle speed ω of the magnetic pole position. And, the oscillation voltage command value calculation unit 37 increases the amplitude of the oscillation voltage command value of q-axis in proportion to the inductance L.

Similar to Embodiment 1, by referring the amplitude gain setting data, the oscillation voltage command value calculation unit 37 may calculate the amplitude gain β.

Alternatively, when the rotational angle speed ω of the magnetic pole position is higher than the speed threshold value which is set corresponding to the cutoff frequency of the current feedback control, the oscillation voltage command value calculation unit 37 may calculate the oscillation voltage command value of q-axis ΔVqoc as mentioned above, and may superimpose it on the voltage command value of q-axis Vqo. When the rotational angle speed ω is lower than the speed threshold value, the oscillation voltage command value calculation unit 37 may not calculate the oscillation voltage command value of q-axis ΔVqoc, and may not superimpose it on the voltage command value of q-axis Vqo.

According to this configuration, in the high speed region where the theoretical leading phase α r approaches 90 degrees, and the theoretical amplitude gain βr approaches N×ω×L, since the superposition of the oscillation voltage command value of q-axis ΔVqoc is performed, even if the correction phase α is simply set to π/2 (90 degrees) and the amplitude gain β is simply set to N×ω×L, the generation of correction errors can be suppressed and the torque ripple component can be canceled.

3. Embodiment 3

Next, the controller 30 according to Embodiment 3 will be explained. The explanation for constituent parts the same as those in Embodiment 1 will be omitted. The basic configuration and processing of the AC rotary electric machine 1 and the controller 30 according to the present embodiment is the same as that of Embodiment 1 or 2. The oscillation range of the oscillation voltage command value of q-axis ΔVqoc in the oscillation voltage command value calculation unit 37 is different from Embodiment 1 or 2.

Figure 9:
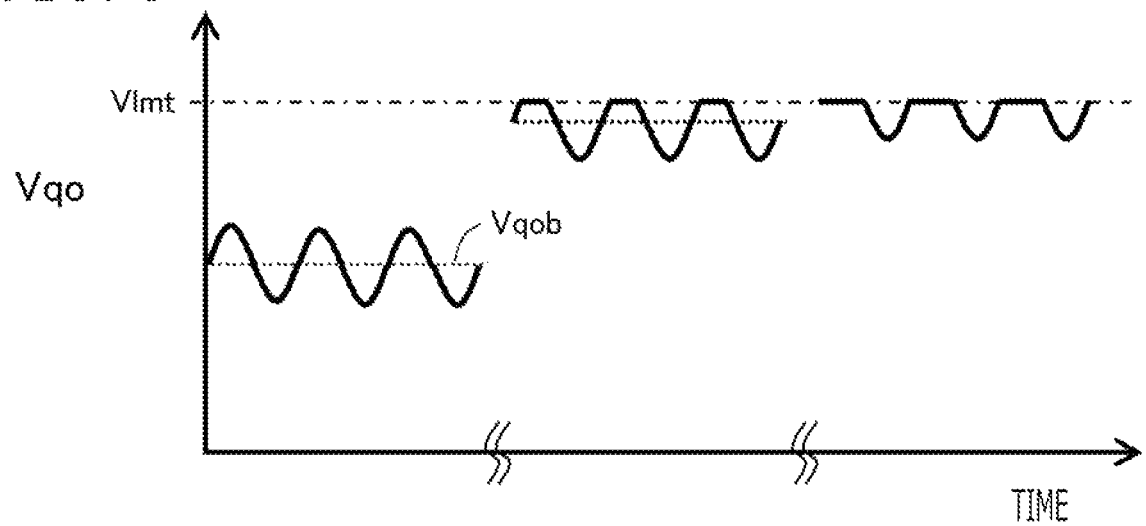
FIG. 9 is a time chart according to the comparative example of Embodiment 3.

The upper limitation value of the applied voltage to the winding is decided by the power source voltage VDC, and the upper limitation values of the voltage command value of d-axis and the voltage command value of q-axis are also decided. Therefore, as shown in the time chart of the comparative example of FIG. 9, the mountain part of the oscillation voltage command value of q-axis ΔVqoc is cut so that the voltage command value of q-axis Vqo after superposition of the oscillation voltage command value of q-axis ΔVqoc does not exceed the upper limitation value Vlmt. Cancellation of the torque ripple component by the cut mountain part is not performed, and cancellation becomes insufficient.

Then, in the present embodiment, the oscillation voltage command value calculation unit 37 decreases the oscillation voltage command value of q-axis ΔVqoc in an offset manner so that the voltage command value of q-axis Vqo after superposition does not exceed the upper limitation value Vlmt by superposition of the oscillation voltage command value of q-axis ΔVqoc.

According to this configuration, the mountain part of the oscillation voltage command value of q-axis ΔVqoc can be prevented from being cut by the upper limitation value Vlmt, and the cancellation effect of the torque ripple component can be prevented from being deteriorated by the upper limitation of the voltage command value of q-axis.

In the present embodiment, as shown in the next equation, when a maximum value before correction Vqmax obtained by adding the amplitude (β×Iqrp0) of the oscillation voltage command value of q-axis to the basic voltage command value of q-axis Vqob exceeds the upper limitation value Vlmt, the oscillation voltage command value calculation unit 37 calculates an oscillation voltage command value of q-axis after offset ΔVqoc_off, by decreasing the oscillation voltage command value of q-axis ΔVqoc by an offset value ΔVoff obtained by subtracting the upper limitation value Vlmt from the maximum value before correction Vqmax. On the other hand, when the maximum value before correction Vqmax does not exceed the upper limitation value Vlmt, the oscillation voltage command value calculation unit 37 does not perform the offset correction, and calculates the voltage command value of q-axis Vqo by superimposing the oscillation voltage command value of q-axis ΔVqoc on the basic voltage command value of q-axis Vqob as it is.

$$Vq\text{max} = Vqob + \beta \cdot Iqrp0 \tag{14}$$

Figure 10:
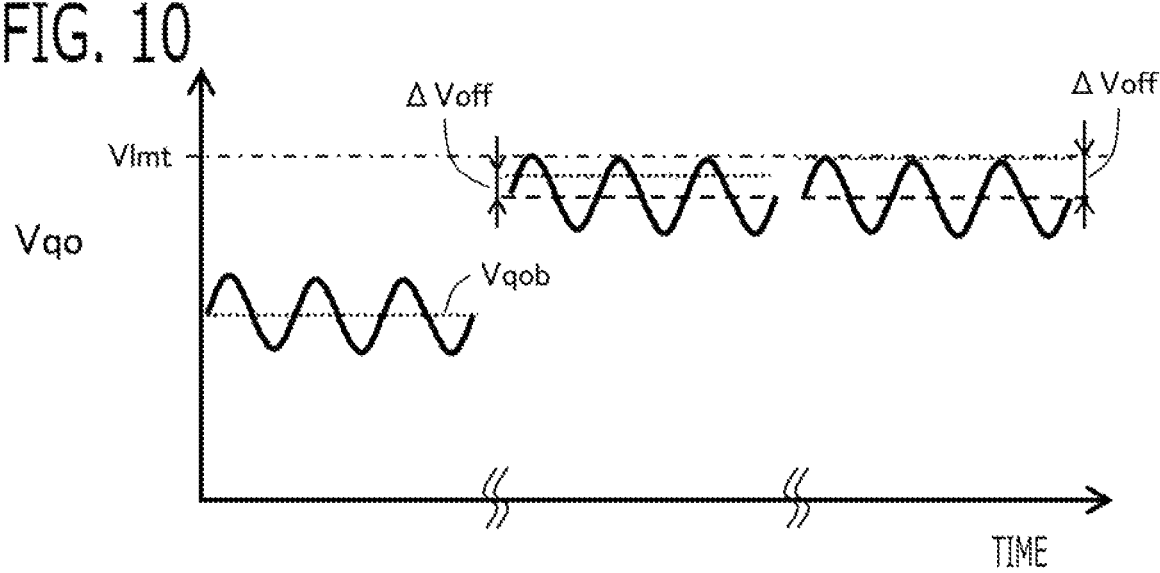
FIG. 10 is a time chart according to Embodiment 3.

1) When $Vq\text{max} > Vlmt$ $\Delta Voff = Vq\text{max} - Vlmt$ $\Delta Vqoc\_off = \Delta Vqoc - \Delta Voff$ $Vqoc = Vqob + \Delta Vqoc\_off$ 2) When $Vq\text{max} \leq Vlmt$ $Vqo = Vqob + \Delta Vqoc$ According to this configuration, as shown in the time chart of FIG. 10, the minimum offset value ΔVoff that the mountain part of the oscillation voltage command value of q-axis ΔVqoc is not cut by the upper limitation value Vlmt can be set; and the variation of the average value of the voltage command value of q-axis Vqo from the basic voltage command value of q-axis Vqob can be suppressed to the minimum. Accordingly, the variation of the average value of the output torque due to the cancellation of the torque ripple component can be suppressed to the minimum.

Alternatively, the oscillation voltage command value calculation unit 37 may calculate the oscillation voltage command value of q-axis ΔVqoc which oscillates between a value obtained by multiplying −2 to the amplitude (β×Iqrp0) of the oscillation voltage command value of q-axis, and 0.

In this case, as shown in the next equation, the oscillation voltage command value calculation unit 37 calculates the oscillation voltage command value of q-axis after offset ΔVqoc_off, by subtracting the amplitude (β×Iqrp0) of the oscillation voltage command value of q-axis from the oscillation voltage command value of q-axis ΔVqoc; and calculates the voltage command value of q-axis Vqo by superimposing the oscillation voltage command value of q-axis after offset ΔVqoc_off on the basic voltage command value of q-axis Vqob.

$$\Delta Vgoc\_off = \Delta Vqoc - \beta \cdot Iqrp0 = \beta \cdot Iqrp0 \cdot \{\cos(N \cdot \theta - \theta rp0 - \pi + \alpha) - 1\} Vqo = Vqob + \Delta Vqoc\_off \quad (15)$$

Figure 11:
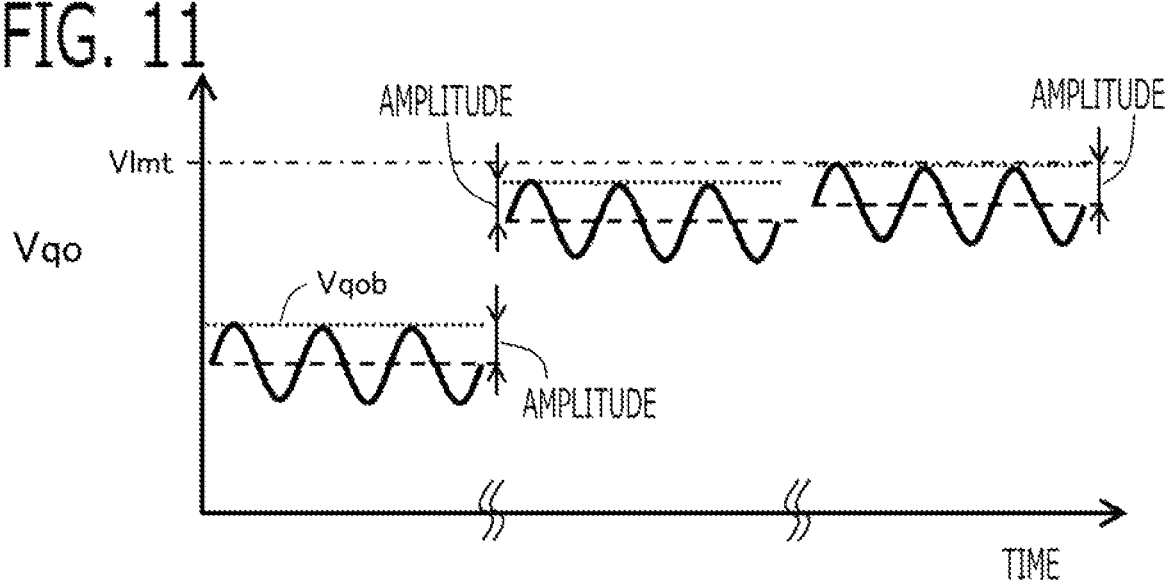
FIG. 11 is a time chart according to Embodiment 3.

In this case, as shown in the time chart of FIG. 11, while reducing the arithmetic load by always offsetting equally, the mountain part of the oscillation voltage command value of q-axis ΔVqoc can be prevented from being cut by the upper limitation value Vlmt, and the torque ripple component can be canceled.

4. Embodiment 4

Next, the controller 30 according to Embodiment 4 will be explained. The explanation for constituent parts the same as those in Embodiment 1 will be omitted. The basic configuration and processing of the AC rotary electric machine 1 and the controller 30 according to the present embodiment is the same as that of Embodiment 1, 2, or 3. Embodiment 4 is different from Embodiments 1, 2, or 3 in that the AC rotary electric machine 1 and the controller 30 are built into the electric power steering apparatus 60.

Figure 12:
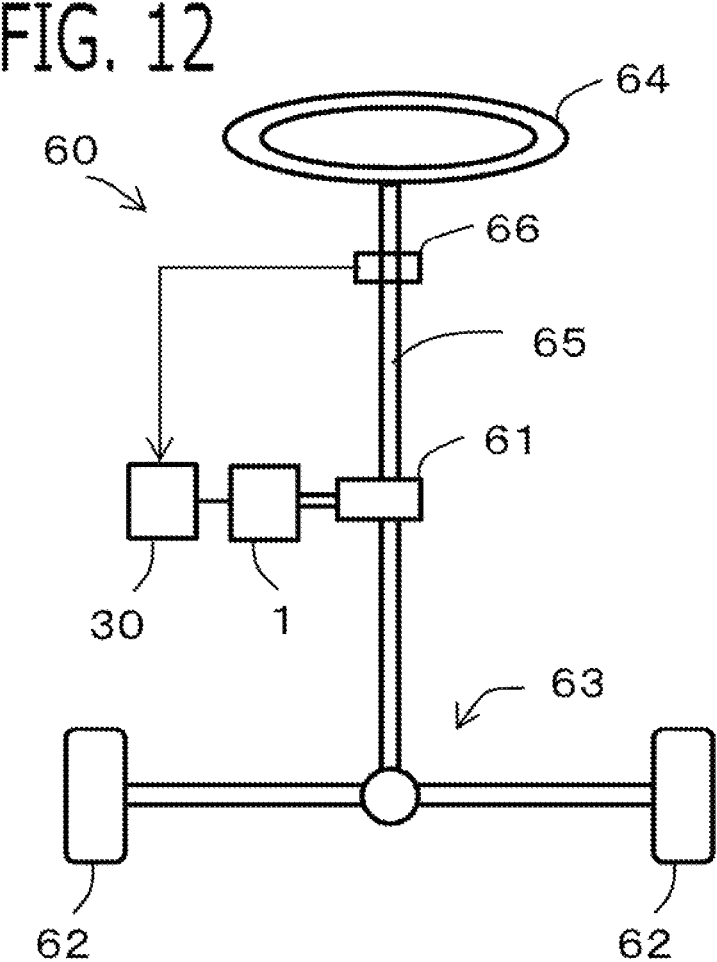
FIG. 12 is a schematic configuration diagram of the electric power steering apparatus according to Embodiment 4.

In the present embodiment, as shown in FIG. 12, the AC rotary electric machine 1 is a driving force source of the steering apparatus 63 of the wheels 62. The AC rotary electric machine 1 and the controller 30 constitute the electric power steering apparatus 60. The rotation axis of the rotor of the AC rotary electric machine 1 is connected with a steering apparatus 63 of the wheels 62 via a driving force transmission mechanism 61. For example, the electric power steering device 60 is provided with a handle 64 that a driver rotates right and left, a shaft 65 that is connected with the handle 64 and transmits a steering wheel torque by the handle 64 to the steering apparatus 63 of the wheels 62, a torque sensor 66 that is mounted on the shaft 65 and detects the steering wheel torque Ts by the handle 64, and a driving force transmission mechanisms 61, such as a worm gear mechanism, which connects the rotation axis of the AC rotary electric machine 1 with the shaft 65.

The output signal of the torque sensor 66 is inputted into the controller 30 (the input circuit 92), and the controller 30 detects the steering wheel torque of the driver Ts based on the output signal of the torque sensor 66. Then, the current command value calculation unit 35 calculates the current command value for assisting the steering wheel torque Ts based on the steering wheel torque Ts. For example, the current command value calculation unit 35 calculates the current command value of q-axis Iqo by multiplying an assistant gain Ka to the steering wheel torque Ts, as shown in the next equation. The current command value of d-axis Ido is set to 0. The assistant gain Ka may be changed according to the travelling speed of the own vehicle, and the like.

$$Ido = 0 \quad (16)$$
$$Iqo = Ka \cdot Ts$$

The current command value calculation unit 35 may calculate the current command values of d-axis and q-axis Ido, Iqo using the maximum torque/current control, the magnetic flux weakening control, or the like, based on the target torque calculated based on the steering wheel torque Ts, and the like.

Also in the AC rotary electric machine 1 used for the electric power steering apparatus 60, the torque ripple component of the order N (for example, 6th order) is superimposed. Due to the torque ripple component, (1) the steering sense of the handle is deteriorated, and (2) when the frequency of the torque ripple component coincides with the mechanical resonance frequency, noise increases. In order to suppress these (1) and (2), it is necessary to superimpose the cancellation current oscillation component on the winding current like Embodiments 1 to 3.

Regarding (1), since the frequency band of the torque ripple component transmitted to the handle is a low frequency band of about 200 Hz or less, by superimposing the oscillation current command value of q-axis ΔIqoc on the current command value of q-axis Iqo, the cancellation current oscillation component can be superimposed on the winding current by the current feedback control, and the steering sense of the handle can be improved.

Regarding (2), since the mechanical resonance frequency becomes a high frequency band (for example, about from 300 Hz to 4000 Hz), the frequency of the cancellation current oscillation component becomes high frequency of 300 to 4000 Hz. Therefore, since the frequency which becomes higher than the cutoff frequency of the current feedback control is also included, it is insufficient just to superimpose the oscillation current command value of q-axis ΔIqoc on the current command value of q-axis Iqo. By superimposing the oscillation voltage command value of q-axis ΔVqoc on the voltage command value of q-axis Vqo, the cancellation current oscillation component cannot be superimposed on the winding current, and noise can be suppressed from increasing by resonance. Accordingly, a cheap AC rotary electric machine whose torque constant varies can be used for the electric power steering apparatus 60.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there was explained the case where the three-phase windings are provided in the stator. However, the phase numbers of winding may be any phase numbers, plural sets of windings may be provided, and the motor control like each embodiment may be performed for the winding of each set.

(2) In each of the above-mentioned Embodiments, there was explained the case where the AC rotary electric machine 1 is a permanent magnet type synchronous AC rotary electric machine. However, embodiments of the present disclosure are not limited to the foregoing case. That is to say, the AC rotary electric machine 1 may be various kinds of rotary electric machines, such as the electromagnet type synchronous AC rotary electric machine, or the induction rotary electric machine.

(3) In each of the above-mentioned Embodiments, there was explained the case where in the case where the torque ripple component does not appear in the current detection value, the oscillation voltage command value of q-axis ΔVqoc is superimposed on the voltage command value of q-axis Vqo, and the oscillation current command value of q-axis ΔIqoc is superimposed on the current command value of q-axis Iqo. However, embodiments of the present disclosure are not limited to the foregoing case. That is to say, in the case where the torque ripple component appears in the current detection value, the oscillation voltage command value of q-axis ΔVqoc may be superimposed on the voltage command value of q-axis Vqo. In this case, since the cancellation current oscillation component is not canceled by the current feedback control, it is not necessary to superimpose the oscillation current command value of q-axis ΔIqoc on the current command value of q-axis Iqo.

(4) In each of the above-mentioned Embodiments, there was explained the case where the term (−ω×Lq×ΔIq) of the cancellation d-axis voltage ΔVdc is ignored. However, embodiments of the present disclosure are not limited to the foregoing case. That is to say, the oscillation voltage command value calculation unit 37 may calculated the oscillation voltage command value of d-axis ΔVdoc using the next equation, and may superimpose it on the basic voltage command value of d-axis Vdob.

$$\Delta Vdoc = \omega \cdot L \cdot Iqrp0 \cdot \cos(N \cdot \theta - \theta rp0) \quad (17)$$

In the equation (17), (N×θ−θrp0) becomes a phase of the torque ripple component, and (ω×L×Iqrp0) becomes an amplitude. As the inductance L, the q-axis inductance Lq is used. The phase θrp0 of the torque ripple component with respect to the N times value of the magnetic pole position θ, the amplitude Iqrp0 of the current of q-axis, and the q-axis inductance Lq are calculated by the same method as each of above embodiments.

(5) In each of the above-mentioned Embodiments, there was explained the case where as the inductance L, the q-axis inductance Lq is used. However, a total value of the q-axis inductance Lq and the d-axis inductance Ld may be used for the inductance L.

(6) In each of the above-mentioned Embodiments, there was explained the case where the order N is 6. However, the order N may be any natural numbers other than 6. If the torque ripple components of plural orders are superimposed, the oscillation voltage command value of q-axis ΔVqoc and the oscillation current command value of q-axis ΔIqoc corresponding to the torque ripple components of each order are calculated, a total value of the oscillation voltage command values of q-axis ΔVqoc of plural orders, and a total value of the oscillation current command values of q-axis ΔIqoc of plural orders may be superimposed on the voltage command value of q-axis Vqo and the current command value of q-axis Iqo, respectively.

(7) In each of the above-mentioned Embodiments, there was explained the case where the equations using the cosine function (cos), the arc tangent function (arctan), and the like are used. However, using the formula of the trigonometric function, the equations converted into any equivalent equations may be used.

(8) In the above Embodiment 4, there was explained the case where the AC rotary electric machine 1 becomes the driving force source of the steering apparatus 63 of the wheel 62, and the AC rotary electric machine 1 and the controller 30 are built into the electric power steering apparatus 60. However, embodiments of the present disclosure are not limited to the foregoing case. The AC rotary electric machine 1 may become a driving force source of any apparatus (for example, wheels) other than steering apparatus 63, and the AC rotary electric machine 1 and the controller 30 may be built into any apparatus (for example, power device of vehicle) other than electric power steering apparatus 60.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: AC Rotary Electric Machine, 20: Inverter, 31: Magnetic Pole Position Detection Unit, 32: Current Detection Unit, 33: dq-axis Current Conversion Unit, 34: Power Source Voltage Detection Unit, 35: Current Command Value Calculation Unit, 36: Basic Voltage Command Value Calculation Unit, 37: Oscillation Voltage Command Value Calculation Unit, 38: Switching Control Unit, 60: Electric Power Steering Apparatus, Ido: d-axis Current Command Value, Idr: Current Detection Value of d-axis, Iqo: Current Command Value of q-axis, Iqr: Current Detection Value of q-axis, Iqrp0: Amplitude of Current of q-axis, ΔIqoc: Oscillation Current Command Value of q-axis, Vdob: Basic Voltage Command Value of d-axis, Vqob: Basic Voltage Command Value of q-axis, Vqo: Voltage Command Value of q-axis, ΔVqoc: Oscillation Voltage Command Value of q-axis, Vlmt: Upper Limitation Value, ΔT: Torque Ripple Component, α: Correction Phase, β: Amplitude Gain, θ: Magnetic Pole Position, θrp0: Phase of Torque Ripple Component, ω: Rotational Angle Speed

What is claimed is:

1. A controller for AC rotary electric machine that controls an AC rotary electric machine which is provided with a stator having a winding and a rotor via an inverter, the controller for AC rotary electric machine comprising at least one processor configured to implement:

a magnetic pole position detector that detects a magnetic pole position of the rotor;

a basic voltage command value calculator that, on dq-axis rotating coordinate system consisting of a d-axis defined in a direction of the detected magnetic pole position and a q-axis defined in a direction advanced to the d-axis by 90 degrees in an electrical angle, calculates a basic voltage command value of the d-axis, and a basic voltage command value of the q-axis;

an oscillation voltage command value calculator that calculates an oscillation voltage command value of the q-axis which has the same frequency as a torque ripple component superimposed on an output torque of the rotor, and which is for canceling the torque ripple component; and a switching controller that controls on/off a plurality of switching devices provided in the inverter, based on the basic voltage command value of d-axis, and a voltage command value of the q-axis obtained by superimposing the oscillation voltage command value of q-axis on the basic voltage command value of q-axis;

wherein the oscillation voltage command value calculator calculates a reverse phase of the torque ripple component, based on a current information which flows through the winding, and the magnetic pole position;

calculates a correction phase, in a period of the oscillation voltage command value of q-axis, which corresponds to a phase delay of an actual current with respect to the oscillation voltage command value of q-axis; and sets a phase of the oscillation voltage command value of q-axis to a phase obtained by advancing the reverse phase of the torque ripple component by the correction phase.

2. The controller for AC rotary electric machine according to claim 1, wherein the oscillation voltage command value calculator sets the correction phase in the period of the oscillation voltage command value of q-axis, to 90 degrees.

3. The controller for AC rotary electric machine according to claim 1, wherein as a rotational angle speed of the magnetic pole position decreases, the oscillation voltage command value calculator reduces the correction phase in the period of the oscillation voltage command value of q-axis within a range from 90 degrees to 0 degree.

4. The controller for AC rotary electric machine according to claim 1, wherein by setting the correction phase to a, setting an order of a frequency of the torque ripple component with respect to a rotational frequency of the magnetic pole position to N, setting a rotational angle speed in an electrical angle of the magnetic pole position to ω, setting an inductance of the AC rotary electric machine to L, and setting a resistance value of the winding to R, the oscillation voltage command value calculator calculates the correction phase, using a calculation equation of $$\alpha = \arctan(N \times \omega \times L/R).$$

5. The controller for AC rotary electric machine according to claim 1, wherein as a rotational angle speed in an electrical angle of the magnetic pole position increases, the oscillation voltage command value calculator increases an amplitude of the oscillation voltage command value of q-axis.

6. The controller for AC rotary electric machine according to claim 1, wherein the oscillation voltage command value calculator calculates an inductance of the AC rotary electric machine based on the current information which flows through the winding; and increases an amplitude of the oscillation voltage command value of q-axis as the inductance increases.

7. The controller for AC rotary electric machine according to claim 1, wherein the oscillation voltage command value calculator calculates an amplitude of a current of the q-axis for canceling the torque ripple component, based on the current information which flows through the winding;

by setting an amplitude gain to β, setting an order of a frequency of the torque ripple component with respect to a rotational frequency of the magnetic pole position to N, setting a rotational angle speed in an electrical angle of the magnetic pole position to ω, setting an inductance of the AC rotary electric machine to L, and setting a resistance value of the winding to R, calculates the amplitude gain, using a calculation equation of $$\beta = \sqrt{(R^2 + (N \times \omega \times L)^2)}; \text{ and}$$

sets a multiplication value of the amplitude of the current of q-axis and the amplitude gain, to an amplitude of the oscillation voltage command value of q-axis.

8. The controller for AC rotary electric machine according to claim 1, wherein the oscillation voltage command value calculator calculates an amplitude of a current of the q-axis for canceling the torque ripple component, based on the current information which flows through the winding; and sets a value obtained by multiplying an order of a frequency of the torque ripple component with respect to a rotational frequency of the magnetic pole position, a rotational angle speed in an electrical angle of the magnetic pole position, and an inductance of the AC rotary electric machine, to an amplitude of the current of q-axis, as an amplitude of the oscillation voltage command value of q-axis.

9. The controller for AC rotary electric machine according to claim 6, wherein by referring to an inductance setting data in which a relationship between the current of winding and the inductance is preliminarily set, the oscillation voltage command value calculator calculates the inductance corresponding to the present current of winding.

10. The controller for AC rotary electric machine according to claim 1, wherein the oscillation voltage command value calculator decreases the oscillation voltage command value of q-axis in an offset manner so that the voltage command value of q-axis after superposition does not exceed an upper limitation value by superposition of the oscillation voltage command value of q-axis.

11. The controller for AC rotary electric machine according to claim 1, wherein the oscillation voltage command value calculator calculates the oscillation voltage command value of q-axis which oscillates between a value obtained by multiplying −2 to an amplitude of the oscillation voltage command value of q-axis, and 0.

12. The controller for AC rotary electric machine according to claim 1, further comprising:

a current command value calculation unit calculator that calculates a current command value of the d-axis and a current command value of the q-axis;

a current command correction value calculator which calculates an oscillation current command value of the q-axis which has the same frequency as the torque ripple component and becomes the reverse phase of the torque ripple component, and which is for canceling the torque ripple component;

a current detector that detects a current flowing through the winding; and a dq-axis unit converter that calculates a current detection value of the d-axis and a current detection value of the q-axis, based on a current detection value of the winding and the magnetic pole position, wherein the basic voltage command value calculator changes the basic voltage command value of d-axis and the basic voltage command value of q-axis so that the current detection value of d-axis approaches the current command value of d-axis, and the current detection value of q-axis approaches the current command value of q-axis on which the oscillation current command value of q-axis is superimposed on.

13. An electric power steering apparatus comprising:
the controller for AC rotary machine according to claim 1, and
an AC rotary electric machine that becomes a driving force source of an steering apparatus of wheels.

* * * * *